United States Patent
Pugh

[11] Patent Number: 5,976,348
[45] Date of Patent: Nov. 2, 1999

[54] IN SITU REMEDIATION OF SOILS CONTAINING ORGANIC CONTAMINANTS USING THE ELECTROMIGRATION OF PEROXYSULFATE IONS

[75] Inventor: J. Richard Pugh, Florence, Ala.

[73] Assignee: Tennessee Valley Authority, United States Corporation, Muscle Shoals, Ala.

[21] Appl. No.: 09/050,655

[22] Filed: Mar. 30, 1998

[51] Int. Cl.[6] ........................................ F21B 43/22
[52] U.S. Cl. ..................... 205/688; 205/766; 204/515; 588/204
[58] Field of Search .................... 205/688, 766; 204/515; 588/204

[56] References Cited

U.S. PATENT DOCUMENTS

| | | | |
|---|---|---|---|
| 4,713,126 | 12/1987 | Woidt et al. | 148/6.14 R |
| 5,137,608 | 8/1992 | Acar et al. | 204/515 |
| 5,398,756 | 3/1995 | Brodsky et al. | 204/515 |

Primary Examiner—Arun S. Phasge
Attorney, Agent, or Firm—Peter D. Olexy

[57] ABSTRACT

Soils are decontaminated in situ by transporting peroxysulfate ions through the soil under the influence of an electric field. The electric field is maintained between one or more anodes and one or more cathodes inserted directly into the contaminated soil and geometrically disposed relative one to the other to take full advantage of a positively biased DC voltage applied between said one or more anodes and one or more cathodes. An aqueous solution of a strong oxidant, either peroxymonosulfate or peroxydisulfate, is added to the contaminated soil. The electric field induces the movement of peroxysulfate ions principally by electromigration and to a lesser extent by electroosmosis. Organic contaminants in the soil are oxidized by the peroxysulfate ions. For very recalcitrant contaminants, electric field-induced heating of the soil produces sulfate radical anions. In most cases the peroxysulfate ions or sulfate radical anions oxidize the contaminants to carbon dioxide and mineral acids. The decontamination occurs in the subsurface and does not require the mobilization of the contaminant. Products of the reaction, such as sulfate, are removed from the soil by continued electromigration and collection at the electrode (s).

10 Claims, 9 Drawing Sheets

IN SITU REMEDIATION OF SOILS CONTAINING ORGANIC CONTAMINANTS USING THE ELECTROMIGRATION OF PEROXYSULFATE IONS

BACKGROUND OF THE INVENTION

1. Field of the Invention

The present invention relates to the in situ decontamination of soils using electric fields to transport strong oxidants, preferably peroxymonosulfate or peroxydisulfate, through the soil. In the practice of this invention, it has been found that the oxidant effects degradation of the contaminant in situ without effecting the mobilization of the contaminant and that the electric field ensures both transport and complete mixing of the oxidant and the contaminant as well as subsequent extraction of the resulting reaction products from the soil.

2. Description of the Prior Art

Peroxymonosulfate ($HSO_5^-$) and peroxydisulfate ($S_2O_8^{2-}$) are strong oxidants capable of degrading most organic compounds. Peroxymonosulfate is an effective oxidizing agent with a redox potential similar to hydrogen peroxide. It is more stable, easier to store and handle than $H_2O_2$. Peroxydisulfate is an even stronger oxidizing agent than $HSO_5^-$ and $H_2O_2$. Both peroxysulfate compounds can be activated by contact with metal ions or by exposure to light to generate sulfate radical anions. The sulfate radical anions are sufficiently strong oxidizing agents to mineralize nearly all organic compounds (convert to carbon dioxide and mineral acids). Unlike hydrogen peroxide or peroxymonosulfate, peroxydisulfate can also generate sulfate radical anions upon the heating thereof. These peroxysulfate compounds are ideally suited for in situ soil remediation because they are water soluble and do not require light activation or the addition and mixing of multiple reagents. They are relatively inexpensive, and are easily handled, stored, and transported.

Peroxymonosulfate has heretofore been used to decontaminate aqueous waste streams containing contaminants such as cyanides, phenols, and lignin. The light catalyzed degradation of organic compounds with peroxydisulfate was mentioned in German Patent DE4330518A1, Blaschke et al, March 1995. Peroxydisulfate has been used in total organic carbon monitors due to its ability to convert virtually all organic matter to $CO_2$ as detailed in G. R. Peyton, *Mar. Chem.*, 1993, 41, 91. These disclosures demonstrate the ability of peroxysulfate compounds to destroy organic contaminants, but all of the oxidations are carried out in aqueous solutions. Accordingly, the use of peroxysulfate compounds in soil remediation applications is not intuitive since these oxidants would be expected to react nonspecifically with the soil and soil organic matter as well as the target contaminants. Furthermore, the use of peroxysulfate compounds would be expected to be limited to ex situ soil remediation due to limitations of mixing the aqueous treatment solutions in undisturbed soils contaminated with hydrophobic organic contaminants. In the case of peroxydisulfate oxidation of recalcitrant contaminants, the requirements of light-, metal-, or heat-activation to generate sulfate radical anions would seem to make in situ soil remediation all but completely impractical. Nonetheless, these limitations are overcome in the practice of the instant invention due to the unexpected specificity of the peroxysulfate compounds for oxidation of the organic contaminants and the ability of electric fields to generate heat and move the oxidants through low permeability soils.

A problem encountered when using aqueous solutions for the treatment of soils is a matrix effect in which the aqueous solution channels around the contaminated soil particles instead of flowing through them. Soils have an inhomogeneous distribution of microscopic and macroscopic pores. With time, hydrophobic organic molecules penetrate into the microscopic pore space of the soil and partition into hydrophobic soil organic matter (Luthy et al. *Environ. Sci. Technol.* 1994, 28(6), pp. 266A–276A; Readman et al. *Sci. Total Environ.* 1987, 66, pp. 73–94). Water added to the soil, either as a washing solution or a solvent for reactants, is repelled by these hydrophobic regions. Additionally, the wash solution takes the path of least resistance and percolates through the macroscopic pores and channels. The basic problem, then, is that the microscopic pores which contain residual amounts of the contaminants are inaccessible to the reagents added for remediation (Di Toro et al., *Environ. Sci. Technol.* 1982, 16, pp. 594–602; Carroll et al., *Environ. Sci. Technol.* 1994, 28, pp. 253–258). In order to remediate contaminated soils, a method of obtaining access to the microscopic pore space in the soil is required.

Electrokinetics is considered the only in situ remediation technology that is able to effect access to the microscopic pores of the soil (Trombly, *Environ. Sci. Technol.*, 1994, 28(6), pp. 288A–291A.). In this technique, electrodes are inserted directly into the soil. The resultant electric field is evenly distributed within the soil and is insensitive to pore size (R. F. Probstein, R. E. Hicks, *Science* 1993, 260, 498.). The resultant electrokinetically-induced movement of ions and pore fluid through soil is relatively insensitive to pore size, so preferential channeling through the largest soil pores is avoided.

Electrokinetic phenomena within the soil are the result of three electric field-induced processes. The first process is electrophoresis, in which ionic colloids move toward the oppositely charged electrode. This process makes only minor contributions toward the total mass flux in consolidated soils. The second electric field induced process, electroosmosis, is of greater importance. The electroosmotic flow of pore fluid is the result of the electric field-induced movement of ions within the double layer formed at the interface of charged porous particles, such as clays, and ionic solutions. The movement of the electrified double layer draws bulk pore fluid along by viscous drag. In soils of high clay content (containing typically negatively charged clays) electroosmosis creates a net movement of pore fluid toward the cathodic electrode. The third of these three electrokinetic processes is electromigration. Electromigration involves the movement of soluble ions within the pore fluid toward the oppositely charged electrode. Generally, electromigration will be the dominant component of the total electric field-induced mass flux within the soil.

The relative contribution of electromigration and electroosmosis to the total mass flux in the soil is determined by the ratio of effective ionic mobilities to the electroosmotic permeability of the soil (Y. B. Acar and A. N. Alshabkeh, *Environ. Sci. Technol.*, 1993, 27, 2638.). The effective ionic mobilities are constant for individual ionic species and are not dependent on soil pH or conductivity. The electroosmotic permeability, however, is dependent on the soil zeta potential and conductivity, and is therefore effected by pH changes and reactions occurring in the soil during electroremediation. The effective ionic mobilities of species in soils have typically been found experimentally to be 10 to 300 times greater than electroosmotic permeabilities. In other words, the contribution of electromigration to the total mass flux across electrified soils is substantially larger than the contribution from electroosmosis. In addition, electroosmosis creates an acid front that sweeps across the soil, and the relative contribution from electromigration would be expected to further increase in dominance as the soil becomes more acidic and conductive as the electroremediation process proceeds.

Conventional electrokinetic remediation technologies seek to extract contaminants from the soil using electroosmosis. The movement of pore water under the influence of the electric field removes soluble contaminants from microscopic pore space. Collopy, U.S. Pat. No. 2,831,804, April 1958, details the electroosmotic removal of salts from agricultural soils. Probstein et al., U.S. Pat. No. 5,074,986, December 1991; Acar et al., U.S. Pat. No. 5,137,608, August 1992; and Pool, U.S. Pat. No. 5,433,829, July 1995, detail methods for extracting metal contaminants from soils using electroosmosis. Kim et al., U.S. Pat. No. 5,098,538, March 1992, detail a method for removing metallic contaminants from soils using both electroosmosis and acoustic energy. The use of these technologies is limited to fairly soluble contaminants. Chang et al., U.S. Pat. No. 5,240,570, August 1993, detail the use of electroosmosis and surfactants to extract polychlorinated biphenyls from the soil. This technology can extract organic contaminants of low aqueous solubility, but it is still an extraction technique and the contaminants are not destroyed in situ. In contrast, the remediation scheme proposed in the instant invention utilizes electromigration to transport oxidants through the soil. Since electrokinetics is used to transport decontaminating solutions, not contaminants, the solubility of the contaminant is not a limitation. The contaminants are degraded in place and secondary treatments are not required. The primary purpose of the instant improved electrokinetic process is to overcome problems with low permeability and channeling which would otherwise prevent the decontaminating solution from reaching the contaminants.

Marks et al., U.S. Pat. No. 5,458,747, October 1995, detail the use of biological reagents in conjunction with electroosmosis to decontaminate soils. The electric field is employed in their technology to extract metallic and soluble organic contaminants, transport biological reagents, and transport nutrients and process chemicals. Their process is limited to the treatment of soils contaminated with readily biodegradable contaminants. On the other hand, the instant invention employs strong oxidants which have been shown to degrade virtually all organic compounds. Thus, there are fewer limitations on the contaminants that can be degraded.

In addition to problems with low soil permeability and contaminant insolubility, soil remediation is often hampered by the chemical inertness of the contaminants. Many soil contaminants are difficult to degrade chemically or biologically. Otherwise the contaminants would degrade due to natural attenuation. Recalcitrant contaminants, such as chlorinated organics, can only be oxidized by extremely reactive chemicals. Due to the inherent reactivity of these extremely reactive chemical oxidants, they have short lifetimes and must be prepared in situ. The oxidant of choice for utilization in the instant technology is the sulfate radical anion which can conveniently be generated in situ by applying moderate heat to a peroxydisulfate containing soil, Eq. 1, infra.

$$S_2O_8^{2-} \xrightarrow{\Delta} 2\,SO_4^{-} \qquad (1)$$

Heat loss during electroremediation has generally been considered a waste of energy from the perspective of electrokinetic extraction of metallic impurities from the soil. Therefore, the prior art in electrokinetic soil remediation strove to use smaller currents and electric fields in order to make the process more energy and cost efficient. The present invention, in contrast, benefits from resistive heating within the soil. The heat generated by larger electric fields supplies the energy required to initiate the cleavage of peroxydisulfate into sulfate radical anions and desorb contaminants from hydrophobic pore space within the soil. Therefore, in remediating soils containing recalcitrant contaminants the present invention uses electric fields which are typically an order of magnitude larger than those utilized in the prior art.

A secondary objective which is realized as a result of practice of the instant, new, and novel electrokinetic process is to contain the reaction products and remove them from the soil in a controlled manner. Most electrokinetic remediation schemes taught and disclosed in the prior art are based on electroosmosis and only work well in packed clay soils. Increased contaminant leaching could occur if electroosmosis drives the contaminant from the clay into sandy areas or fractures in the soil (Acar et al., *Waste Manage*, 1993, 13, pp. 141–151). Since the method proposed in the instant new and novel process uses electromigration to deliver reagents rather than to mobilize the contaminants, only the peroxysulfate compounds are free in solution. The contaminants are still sorbed to the soil so the most undesirable risk of spreading the contamination is dramatically reduced. It is noteworthy that the peroxysulfate reagents are easily degraded and decompose to sulfate and water within days (Toennies, *J. Am. Chem. Soc.*, 1937, 59, p. 555), since in instances when an area of the soil having a very high permeability is to be treated by practice of the instant invention and the electric field is unable to completely contain the mobile reagents during electrokinetic remediation, only relatively innocuous materials, such as sulfate, will break containment. In addition, electromigration across soils is at least an order of magnitude faster than is electroosmosis (Acar et al., *Environ. Sci. Technol.*, 1993, 27, p. 2638; and Hicks et al., *Environ. Sci. Technol.*, 1994, 28, pp. 2203–2210) and is efficient in both high and low porosity and in both saturated and unsaturated soils (Lindgren et al., *Environmental Remediation*, 1991). Therefore, leaching in arid, sandy, or heterogeneous soils is less likely. Furthermore, the continued migration and removal of expected reaction products, such as sulfate, from contaminated soils and aquifers using electromigration should be readily accomplished (Runnells et al., EPRI TR-104170 Project 8060, 1994).

As noted above, the instant invention offers several advantages over electroosmotic remediation processes. First, the process time, heretofore referred by such prior art processes, is dramatically reduced by the practice of the instant invention because the electromigration of ionic species across the soil occurs much more rapidly than transport by electroosmosis. Second, common problems that have plagued electroosmotic methods, such as the consolidation of the treated soil, the buildup of pH gradients, or the precipitation of the contaminant near the electrodes, are reduced because electroosmosis is only a minor contributing factor in the practice of the instant invention. Third, the increased efficiency of electromigration relative to electroosmosis allows a wider range of more reactive electrodes to be used since the electrodes will likely remain intact during the shorter duration of the electromigration process. This is an important consideration in instances where it would be convenient to use buried metallic objects, such as previously discarded 55 gallon drums or leaking underground storage tanks, as electrodes.

SUMMARY OF THE INVENTION

The present invention relates to a method for decontamination of porous media, such as soil, using an aqueous solution containing peroxysulfate oxidants migrating under an applied electric field. In a preferred embodiment thereof, porous cylinders containing electrodes, comprised of graphite, vitreous carbon, or other nonreactive conducting substrate, are inserted into the soil in a manner so as to effectively surround the area defining the contaminated region. The anodes, either one or many, are inserted on one side of a region of the contamination, and the cathodes are inserted on the other side. An aqueous solution containing either peroxymonosulfate or peroxydisulfate is added to the soil. In soils of relatively high permeability the addition of the oxidizing solution can be made directly to the surface of the contaminated region of soil and allowed to percolate downward into the soil. In soils of low permeability the addition of the oxidant solution can be made by means such as porous wells inserted into the soil between the cathodes and the contaminated soil. It has been found that upon application of a static electric field between the electrodes, the peroxysulfate anions migrated toward the anode electrode compartments. Simultaneously, pore water sorbed within the microscopic pores of the soil moved toward the cathodes (in typically negatively charged soils) due to electroosmosis. The electric field forced the oxidant solution through the contaminated soil. The peroxysulfate compounds oxidized the organic contaminants as they passed through the contaminated soil. Unreacted peroxysulfate compounds, sulfate, and soluble organic reaction products continued to migrate under the influence of the electric field, and were collected in the porous wells surrounding the electrodes. A constant purge solution comprising aqueous media was passed through the electrode compartments to prevent pH gradients from building up at the electrodes, and to remove salts and ionic metallic and organic contaminants which were transported to the electrodes. The electric field gradient was adjusted, usually between about 5 to about 20 volts per cm, to maintain an elevated temperature within the soil, albeit only about 5 to about 20 volts per meter would be normally sufficient to effect the desired movement of oxidants by the herein described electromigration technique, if attendant therewith was not the further desirability and requirement of heating the soil and maintaining same at elevated temperature for effecting oxidation of recalcitrant contaminants. In the presence of peroxydisulfate the resulting heated soil produced sulfate radical anions which enabled the further oxidation of recalcitrant contaminants.

OBJECTS OF THE INVENTION

It is therefore the principal object of the present invention to develop a method for degrading organic contaminants in a porous medium in situ using aqueous solutions of peroxymonosulfate or peroxydisulfate.

Another object of the present invention is to provide a method using electric fields for transporting peroxymonosulfate or peroxydisulfate solution through low permeability porous media to the site of contamination.

Still another object of the present invention is to provide a method using electric fields for generating heat within soil in order to produce highly reactive sulfate radical anions in situ.

Yet another object of the present invention is to provide a method for containing the spread of the decontaminating solution and removing reaction products from porous media using electric fields.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true spirit and scope of the instant invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Figure 1:
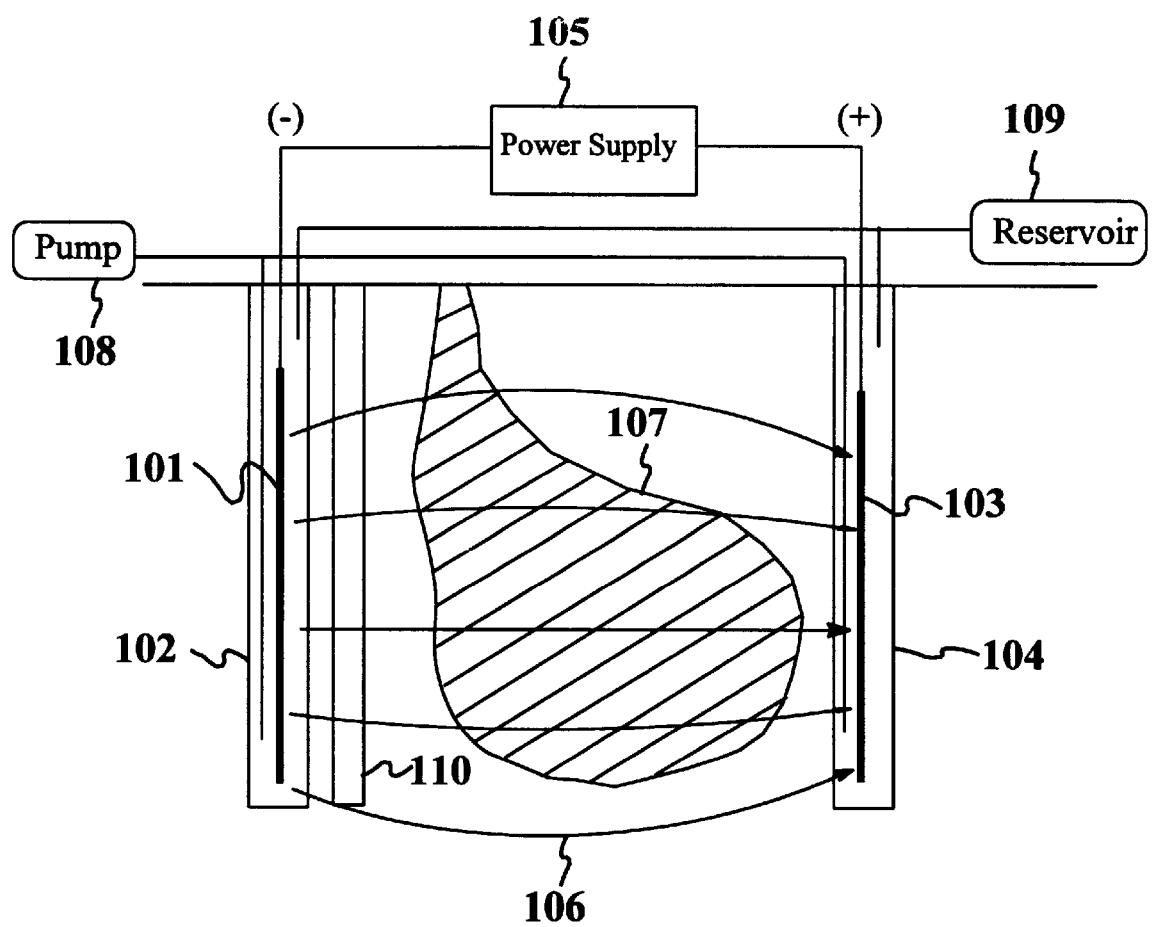
FIG. 1 is a schematic side elevational representation of the first preferred embodiment for the electrode arrangement.
Figure 2:
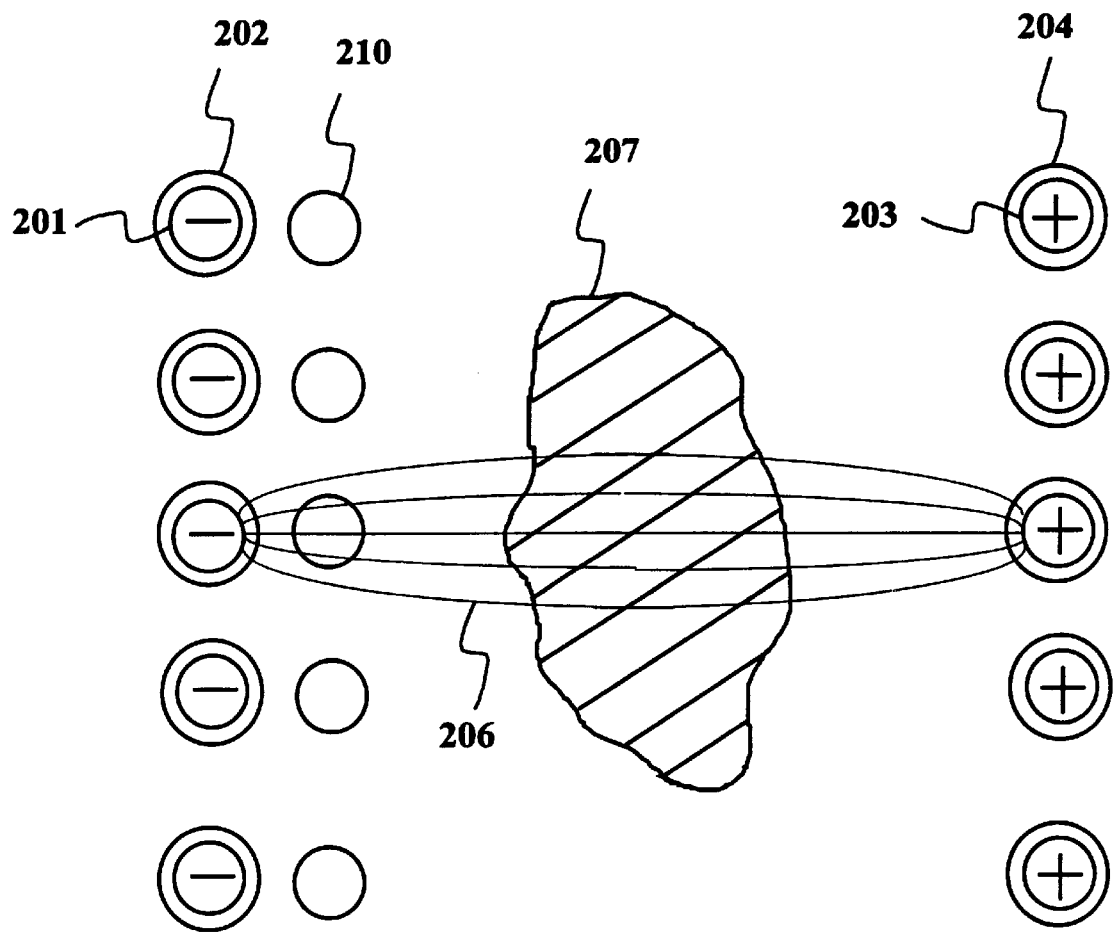
FIG. 2 is a schematic planar representation of the first preferred embodiment for the electrode arrangement.

Referring now more specifically to FIGS. 1 and 2, therein are depicted two perspectives of the first preferred embodiment of the instant invention. As shown, electrodes are inserted into the soil on opposing sides of a contaminated region wherein an array of cathodes in porous housings, one of which is represented in FIG. 1 at 101 and 102 and in FIG. 2 at 201 and 202, respectively, are placed on one side of the contaminated region, and an array of anodes, one of which is shown at 103/203, also in porous housings such as 104/204 are placed on the other side. For convenience to the reader, hereinafter where an element such as one such cathode is represented in more than one FIGURE, the referring to same may conveniently be made simply as 101/201. An electric field of the order of 0.2–100 V/cm is applied via power supply 105 across the soil between the array of cathodes and the array of anodes so that the electric field lines, one of which is for example represented 106/206, pass directly through the contaminated region of the soil 107/207 (represented by the cross-hatched area in the drawing). A weak (~500 ppm) aqueous sulfate solution is continuously passed through electrode compartments 102/202 and 104/204 via peristaltic pump 108. The overflow from the electrode compartments is collected in reservoir 109. An aqueous solution of peroxymonosulfate or peroxydisulfate, although not shown, may conveniently be added directly to the surface of the soil in any region generally between the anode and cathode or the arrays thereof but preferably closer to the cathode so that as it initially percolates downward through the contaminated soil, to a depth wherein it enters or begins to enter the contaminated plume, the effect of the electric field lines of flux cause the generally vertically downwardly percolating fluids to be urged in the horizontal vector by the horizontal vector thereof and thereby change the movement from initially generally vertically to a generally horizontal direction parallel to the flux lines flowing to the anodic, or array of the anodic electrodes. Alternatively, in less permeable soils, the peroxysulfate solution may be added to a plurality of wells arranged in an array directly between the cathode array and the contaminated soil of the type illustrated for convenience at 110/210. The depth of the electrodes and the peroxysulfate wells equals or exceeds the depth of the contaminant area or plume illustrated by the cross-hatched area 107.

Figure 3:
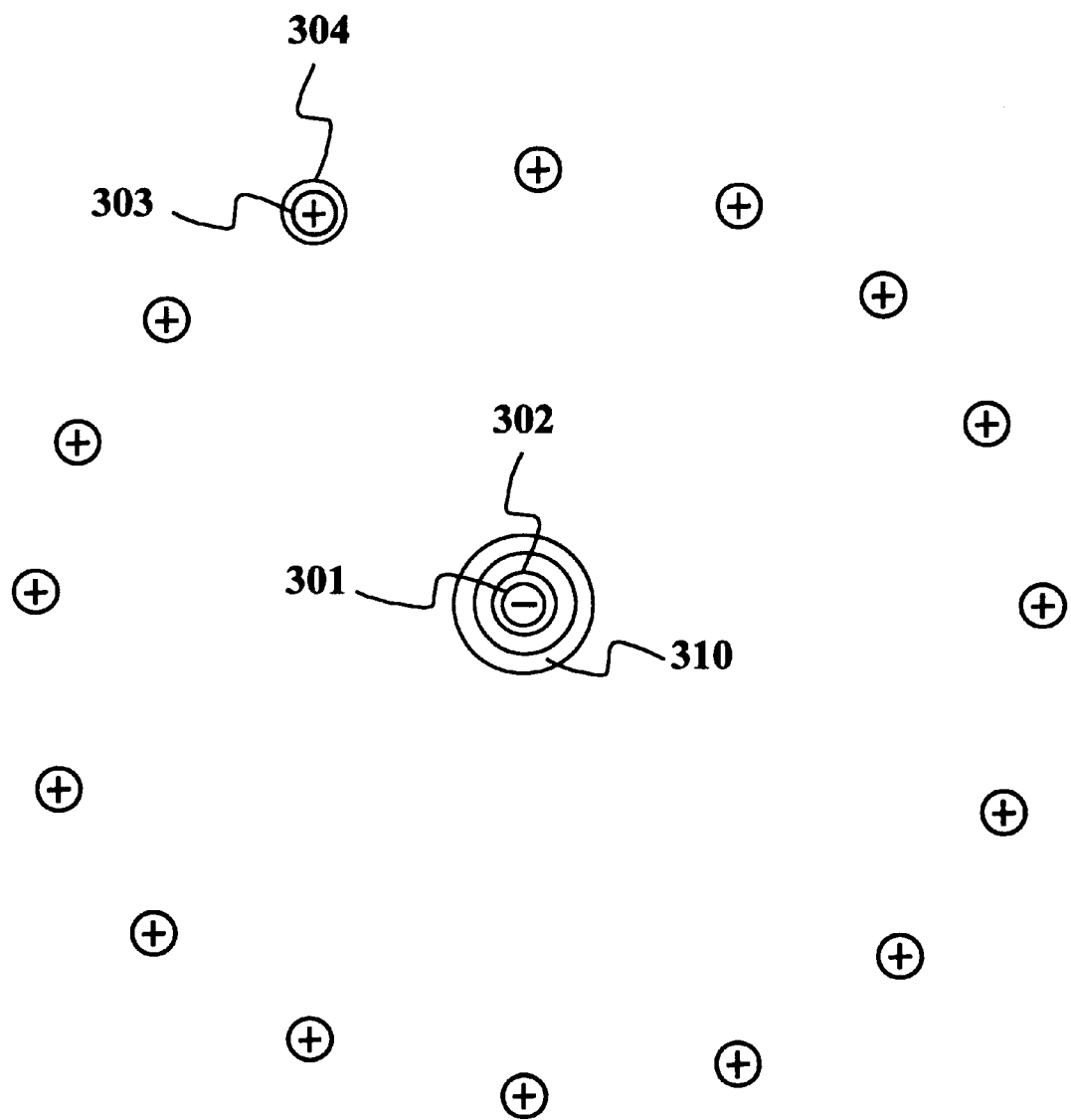
FIG. 3 is a schematic planar representation of the second preferred embodiment for the electrode arrangement.

Referring now more specifically to FIG. 3, therein is illustrated the second preferred embodiment of the instant invention. In this embodiment, single cathode 301 is placed generally at the center of a contaminated region of the soil. A ring of anodes, one of which is shown for convenience at 302, are placed some distance away from the cathode. An aqueous solution of peroxymonosulfate or peroxydisulfate is added directly to the contaminated soil in the region generally juxtaposed the cathodic electrode or if preferred directly into circular well 310 which surrounds the cathode.

Figure 4:
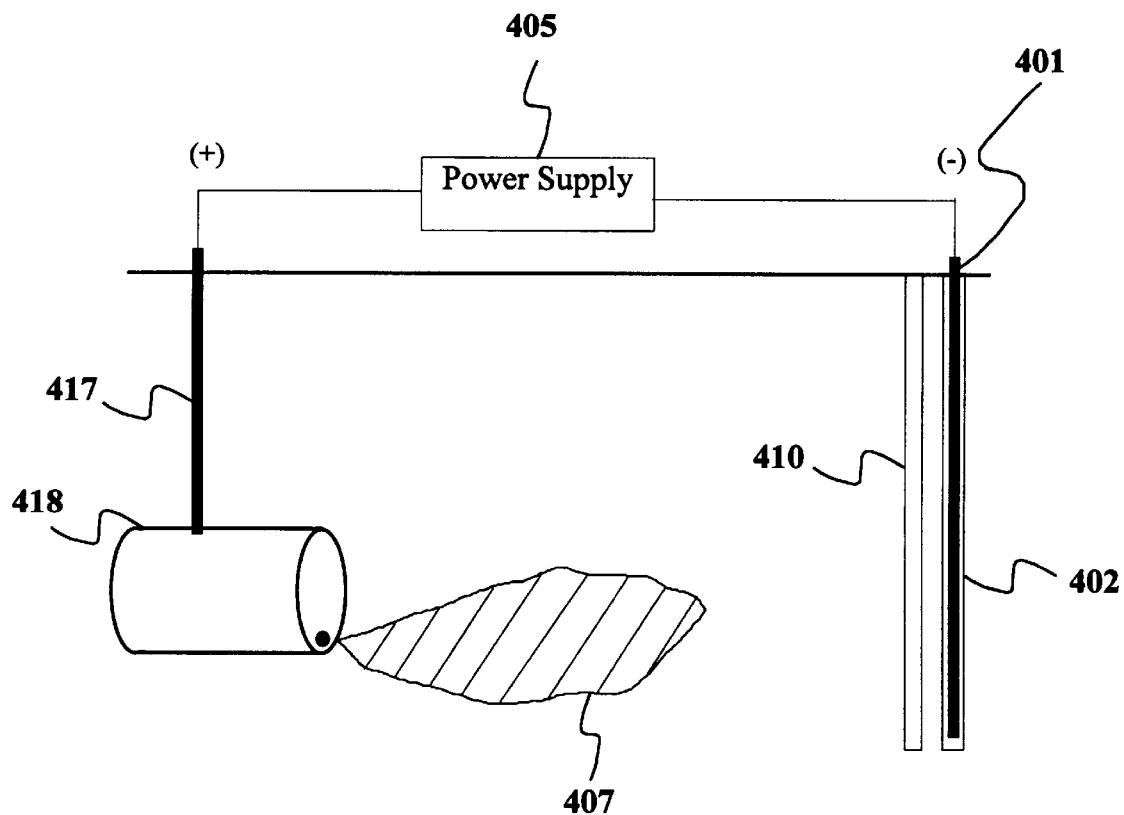
FIG. 4 is a schematic side elevational representation of the third preferred embodiment for the electrode arrangement.

Referring now more specifically to FIG. 4, therein is illustrated a third preferred embodiment of the invention. A metallic probe 417, such as a cone penetrometer, is inserted into the soil to make physical and electrical contact with buried metallic object 418, illustrated for convenience as a 55 gallon drum. Drum 418 is used as an anode with penetrometer 417 providing electrical contact. An array of cathodes, one of which is illustrated for convenience at 401, are positioned around the contaminant plume 407 so that the plume is between the anode and cathodes. The cathodes are immersed in porous wells, as represented by 402, inserted into the soil. An electric field is applied between anode 418 and cathode arrays via power supply, 405. Peroxysulfate solution is applied either directly to the soil between anode 418 and cathode 401 or in wells 410 inserted in the soil between the cathode array and contaminant plume 407. The oxidant ions migrate parallel to the electric field from wells 410 to buried drum 418.

Figure 5:
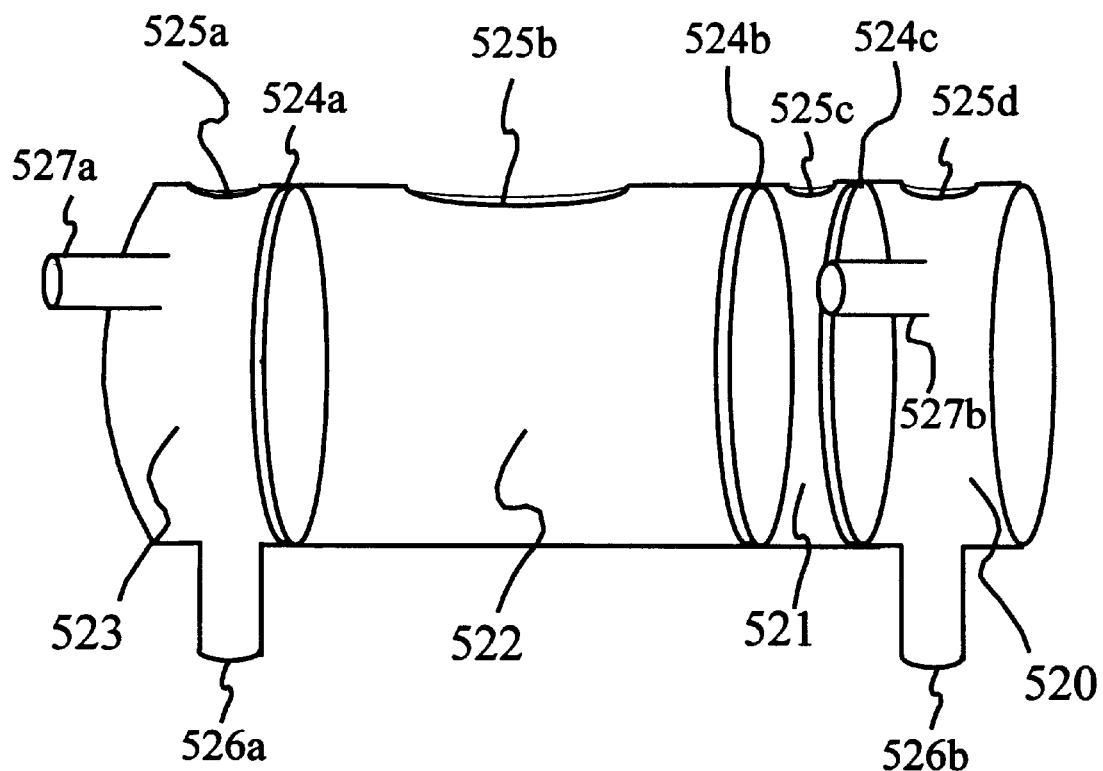
FIG. 5 is a schematic side elevational illustration of the test cell used to demonstrate the electromigration of peroxymonosulfate.

Referring now more specifically to FIG. 5, therein is illustrated the test cell used in bench-scale studies of the instant, new, and novel electrokinetic process. It comprises a glass cylinder separated into four compartments, 520–523, by porous glass frits, 524a–c. Compartment 520 houses the negatively biased electrode (cathode), not shown. Compartment 521 is filled with an aqueous oxidant solution, either peroxymonosulfate or peroxydisulfate, also not shown. Compartment 522 is filled with the contaminated soil, not shown. Compartment 523 houses the positively biased electrode (anode), also in the top of the cylinders, illustrated generally at 525a–d. Electrode compartments 520 and 523, not shown. All four compartments, 520–523, are open to the atmosphere through apertures 525a–d. Compartments 520 and 523 are provided with inlets generally shown at 526a–b, and outlets, 527a–b for passing conditioning solutions through these electrode-containing compartments. Compartment 522 is 5 cm long and 4 cm in diameter. Compartment 521 is 1 cm wide, and compartments 520 and 523 are 1.5 cm wide and 4 cm in diameter with outlets 527a–b placed so as to maintain a 3 cm high column of aqueous solution.

Figure 6:
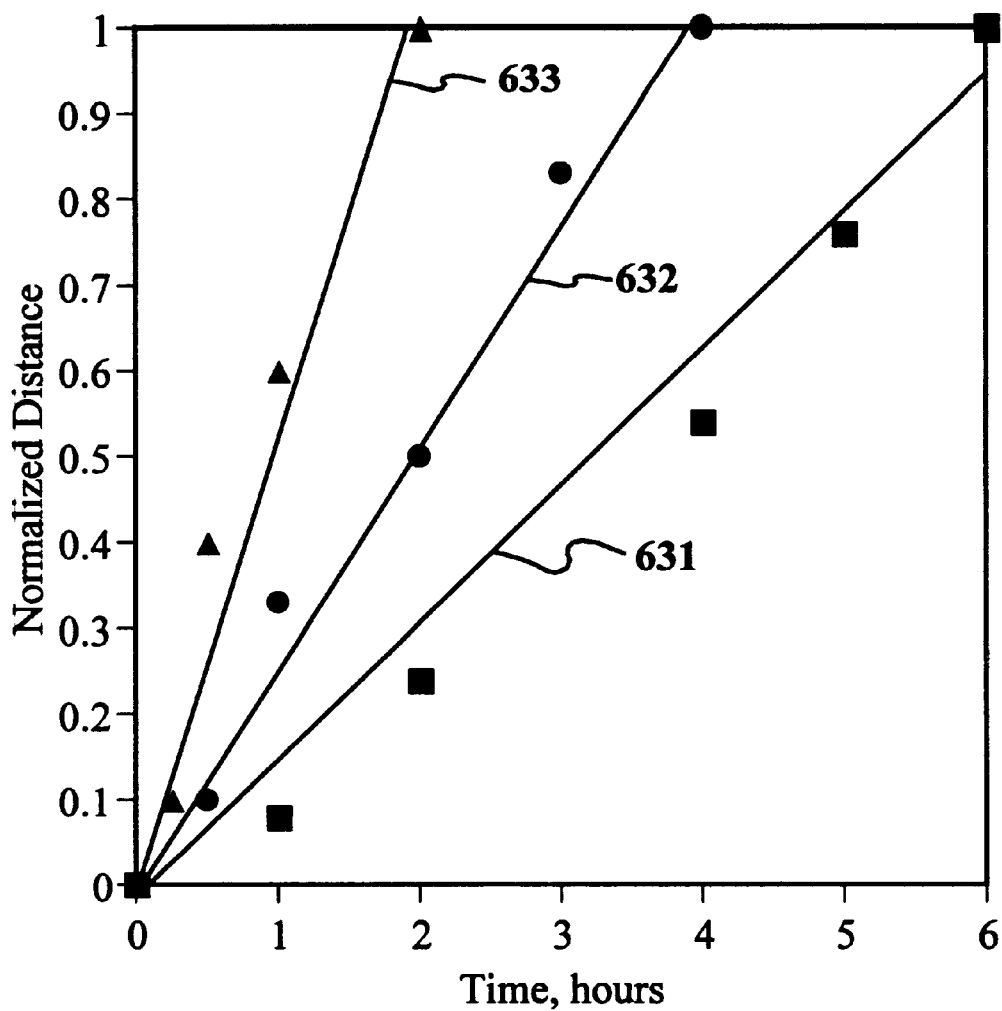
FIG. 6 is a graph illustrating the extent of electromigration of peroxymonosulfate across a column of contaminated porous media. Line 601 represents data from the electromigration of peroxymonosulfate in Kaolin clay which has been coated with a redox-active dye, o-tolidine. Line 602 represents data from the electromigration of peroxymonosulfate in quartz sand which has been coated with o-tolidine. Line 603 represents data from the electromigration of peroxydisulfate in o-tolidine-coated Kaolin clay.

Referring now more specifically to FIG. 6, therein is illustrated the efficient migration of peroxysulfate oxidants across a contaminated soil column. O-tolidine is a representative soil contaminant that was chosen because it has low aqueous solubility and changes from colorless to yellow upon oxidation. Upon applying a modest electric field of 5 V/cm between the electrode compartments, a yellow front developed as the peroxysulfate oxidant moved across the clay and oxidized the organic contaminant. The advance of the oxidant front was graphed as the distance from the oxidant compartment relative to the length of the clay column at various times after application of the electric field. The electromigration of peroxymonosulfate through an O-tolidine-coated clay column is shown by line 631. The electromigration of peroxymonosulfate through an O-tolidine-coated sand column is shown by line 632. Line 633 represents the electromigration of peroxydisulfate through an O-tolidine-coated clay column. The applied electric field was increased from 25 V (5 V/cm) to 100 V (20 V/cm) for the peroxydisulfate experiment, line 633, in order to increase the temperature within the soil.

Figure 7:
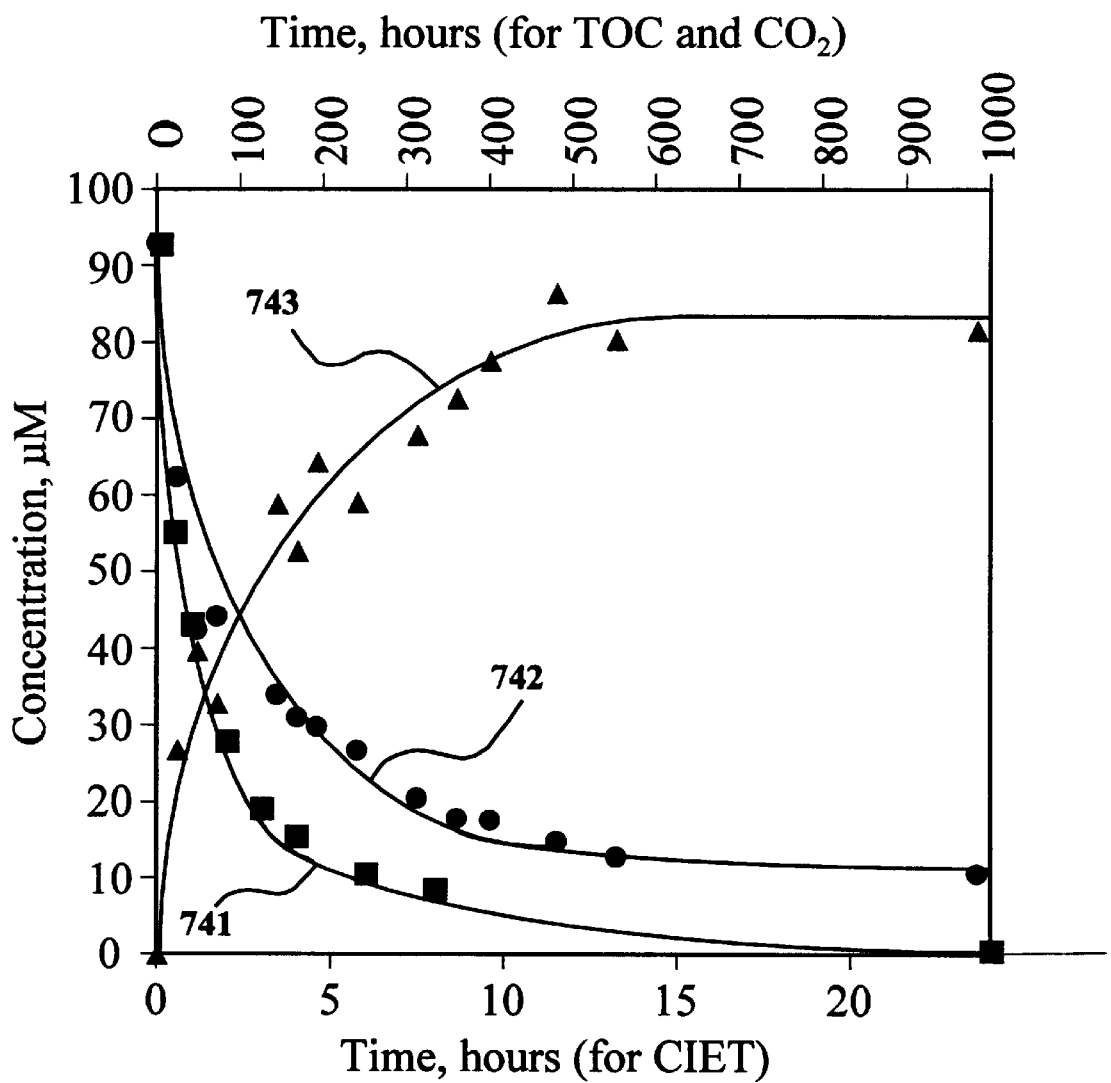
FIG. 7 is a graph illustrating the conversion of a representative organic contaminant, atrazine, to carbon dioxide by peroxymonosulfate. The lines represent the concentrations of atrazine, 741, total organic carbon, 742, and carbon dioxide, 743.

Referring now more specifically to FIG. 7, therein is demonstrated the oxidizing ability of peroxymonosulfate. Atrazine was used as a representative soil contaminant. In the presence of peroxymonosulfate solution, $^{14}$C-radiolabeled atrazine was rapidly oxidized. The concentration of atrazine in an aqueous solution was recorded for 24 hours, as shown by line 741. The data were plotted as atrazine concentration vs. time, using the lower x-axis. Line 742 represents the concentration of soluble $^{14}$C-labeled reaction products (total organic carbon, TOC) remaining in solution. Line 743 represents the concentration of $^{14}$C-labeled $CO_2$ that was observed as the product of the complete oxidation of atrazine. The data represented by lines 742 and 743 were plotted as concentration of radiolabeled material vs. time, using the upper x-axis.

Figure 8:
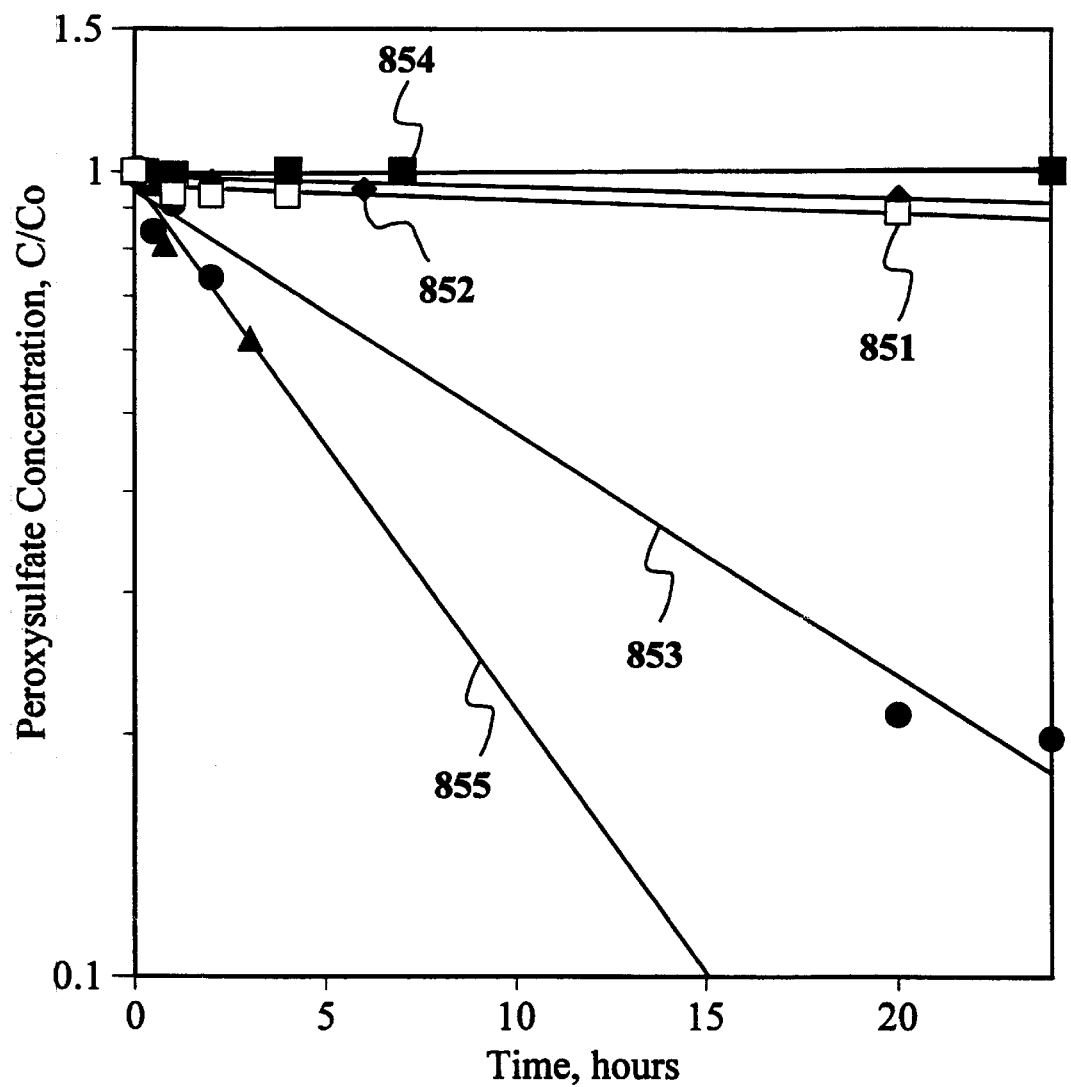
FIG. 8 is a graph which demonstrates the selectivity of peroxysulfate compounds for oxidation of organic contaminants. The lines represent the concentration of peroxymonosulfate in uncontaminated aqueous slurries of sand, 851, Kaolin clay, 852, and Decatur silt loam, 853. Line 854 represents the concentration of peroxydisulfate in an aqueous slurry of uncontaminated Decatur silt loam. Line 855 represents the concentration of peroxymonosulfate in an aqueous slurry of atrazine contaminated Decatur silt loam.

Referring now more specifically to FIG. 8, the graph therein demonstrates the selectivity of peroxymonosulfate and peroxydisulfate for the target contaminants. In the presence of inorganic components of soils, such as sand and clay, the peroxysulfate compounds were stable over the experimental time frame, see lines 851 and 852. Peroxydisulfate did not react with soils, as represented in line 854 for Decatur silt loam. Peroxymonosulfate did degrade in Decatur silt loam, see line 853. However, the rate of peroxymonosulfate degradation on uncontaminated soil was substantially less than the rate of degradation on atrazine contaminated soil, see line 855.

Figure 9:
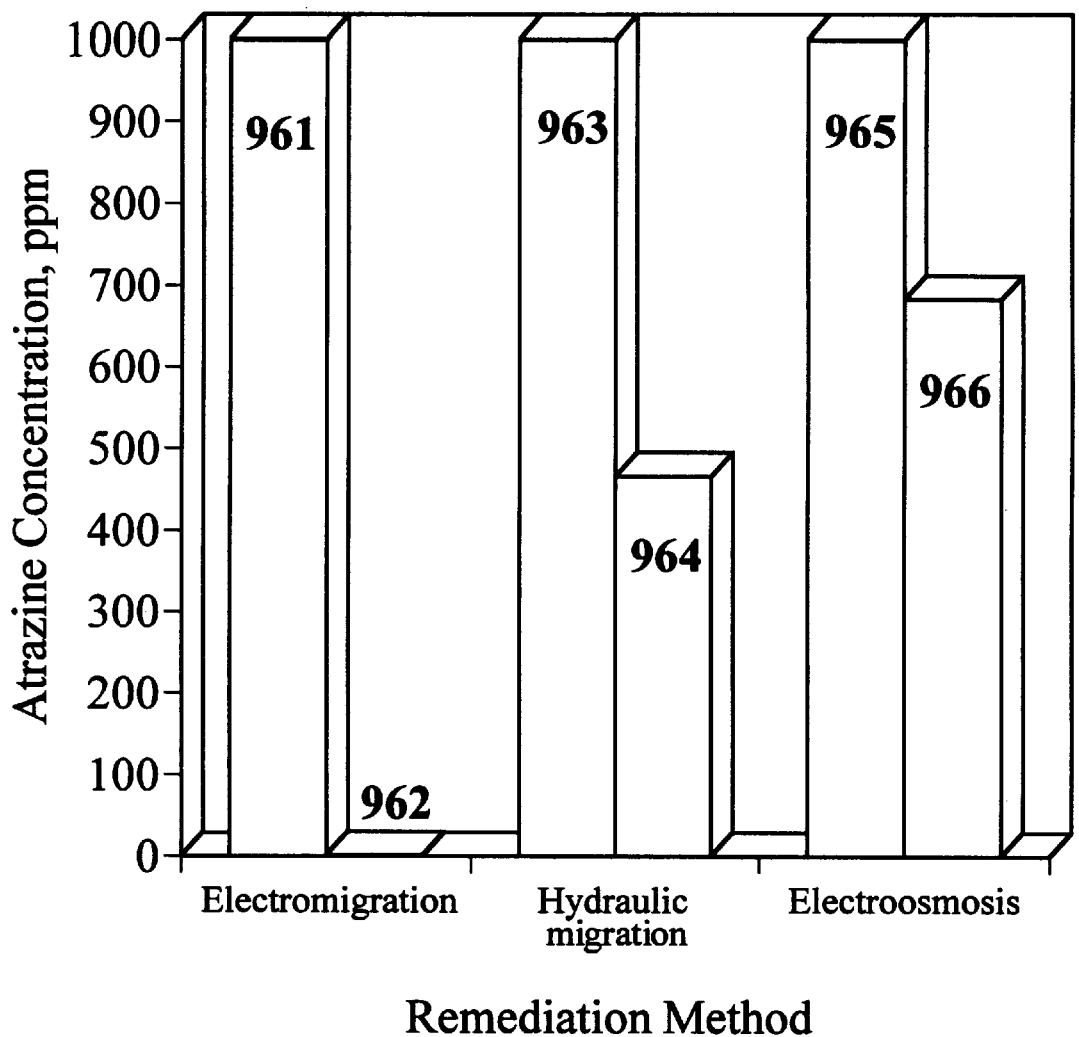
FIG. 9 is a graph comparing the abilities of electroosmosis, electromigration of peroxymonosulfate, and hydraulic migration of peroxymonosulfate to remove atrazine from a Kaolin clay test cell. The bars represent the concentrations of atrazine found in soil: before 961 and after 962 exposure of atrazine to peroxymonosulfate migrating under an electric field; before 963 and after 964 exposure of atrazine to peroxymonosulfate migrating under a hydraulic gradient; before 965 and after 966 exposure of atrazine to an electric field in the absence of added peroxymonosulfate.

Referring now more specifically to FIG. 9, the bar charts shown therein demonstrate the results of an experiment in which an atrazine contaminated clay column was treated for 72 hours by electromigrating peroxymonosulfate. When an electric field of 5 V/cm was applied across the electrokinetic test cell (shown in FIG. 5, supra) containing atrazine contaminated clay and peroxymonosulfate solution, the atrazine concentration on the clay was reduced from 1000 ppm (see bar chart 961) to 1.1 ppm (see bar chart 962). In contrast, when no electric field was applied and the peroxymonosulfate was allowed to migrate under a hydraulic head of 3 cm, the atrazine concentration on the clay was reduced from 1000 ppm (see bar chart 963) to 466 ppm (see bar chart 964). When an electric field of 5 V/cm was applied across the cell, but no peroxymonosulfate was added to the test cell, the atrazine concentration on the clay was reduced from 1000 ppm (see bar chart 965) to 683 ppm (see bar chart 966).

DESCRIPTION OF THE PREFERRED EMBODIMENTS

Three preferred embodiments for the instant invention are illustrated in FIGS. 1–4. The first preferred embodiment involves placing arrays of two generally parallel lines of electrodes within the soil such that a contaminated region of the soil is between the two electrode arrays, FIGS. 1 and 2. The electrodes are placed in electrical contact with a DC power supply such that one array of electrodes comprises the cathodes and the other parallel array comprises the anodes. The distance between the anodes and cathodes is dependent on soil characteristics and the nature of the contaminant, but is usually between 1–10 meters. The polarization of the electrodes and the buildup of pH gradients is minimized by continuously passing a weak $KHSO_4$ electrolyte solution through the electrode wells. Overflow from the electrode wells is stored in a reservoir.

An aqueous solution of peroxymonosulfate or peroxydisulfate is added directly to the surface of the soil in the region between the anode and the cathode or arrays thereof and preferably closer to the cathode than the anode so that it percolates downward through the contaminated soil. Upon reaching the electric field, the generally vertically downward percolation of the peroxysulfate ions is altered by the influence of the static electric field thereon and changed by the urging of such material under the influence thereof to a generally horizontal direction so that the resultant migration is parallel to the field lines in a direction toward the anode array. Upon reaching the anode wells, the residual peroxysulfate ions, sulfate, and ionic organic reaction products are removed to a reservoir via any suitable means, such as for convenience, a perastaltic pump. In less permeable soil, the peroxysulfate solution is added to a plurality of wells arranged in an array directly between the cathode array and the contaminated region of the soil. The negatively charged peroxysulfate ions migrate away from the cathode toward the anode array. The depth of the electrodes and the peroxysulfate wells preferably equals or exceeds the depth of the contaminant area or plume. Extending the electrodes past the vadose zone into ground water will not effect the efficiency of the process since the movement of the peroxysulfate ions and the resulting ionic reaction products will be controlled and contained by the electric field. In areas of widespread contamination, where the distance between the anode and cathode would require too large of an electric field if the entire contaminated area were spanned, several coupled arrays of anodes and cathodes may be used.

The second preferred embodiment of the instant invention is illustrated in FIG. 3. In this case, a single cathode is placed in a porous well at the center of a contaminated region of soil. The cathode is surrounded by a ring of anodes spaced apart therefrom and also provided in individual porous wells. As in the first preferred embodiment, peroxysulfate solution is added to the soil, either by percolation downward through permeable soils or by addition to a circular well that surrounds the cathode well. Upon application of a DC electric field, the peroxysulfate ions migrate outward away from the cathode toward the anodes. A subtle variation of this preferred embodiment would be to place a single anode in the center of the contaminated soil and surround it with a ring of cathodes. This variation would be equally preferred in high permeability soils, but would be slightly less suitable for low permeable soils due to the need for multiple wells for oxidant addition, whereas the use of a single cathode in the center would require only one oxidant well.

FIG. 4 illustrates a third preferred embodiment of the invention. In the case that the contaminant plume originates from buried metallic drums or leaking underground storage tanks, the drums or tanks are integrated into the remediation scheme. A metallic probe, such as a cone penetrometer, is inserted into the soil to make physical contact with the buried objects (hereafter referred to as drums). Any residual bulk chemical in the drum is removed to the surface by pumping it through the penetrometer. The drum is then used as an anode with the penetrometer providing electrical contact. An array of cathodes are positioned around the contaminant plume so that the contaminated plume is between the anode and cathodes. Peroxysulfate solution is applied either directly to the soil between the anode and cathode or in wells inserted in the soil between the cathode array and the contaminant plume. The oxidant ions migrate parallel to the electric field from the wells to the buried drum. As in the second preferred embodiment, the buried metallic objects could also serve as the cathode and the surrounding electrodes could serve as anodes. The penetrometer probe is made of noncorrosive material such that it will serve as the electrode if the metallic drum is too corroded to be conductive or is consumed by electrolysis.

EXAMPLES

In order that those skilled in the art may better understand how the present invention can be practiced, the following examples are given by way of illustration only.

Example I

Six sets of tests were carried out in order to demonstrate the electromigration of peroxysulfate compounds through various soils, and to demonstrate the ability of peroxysulfate compounds to oxidize organic contaminants in situ. In the first example, a test cell was constructed and filled with soils contaminated by a redox-active dye. The test cell was as illustrated in FIG. 5. The results of three tests designed to assess the viability of the electromigration process are illustrated graphically in FIG. 6. The tests used columns of soil coated with a redox-active dye, O-tolidine. O-tolidine is a representative contaminant that was chosen because it has low aqueous solubility and changes from colorless to yellow upon oxidation. Upon applying a modest electric field of 5 V/cm between the electrode compartments, a yellow front moved across the soil column originating from the oxidant compartment and moving toward the anode compartment. The yellow front developed as the peroxysulfate ions moved across the clay and oxidized the organic contaminant. In the first example, a soil column comprised of O-tolidine-coated Kaolin clay was treated with an electromigrating solution of peroxymonosulfate. The oxidant front advanced at approximately 1 cm/hour, as shown by line 601. After six hours the peroxymonosulfate had migrated across the clay column and oxidized all of the contaminant. The front remained uniform during the entire experiment and no evidence of channeling or preferential flow was observed.

Example II

The procedure described in Example I, above, was repeated using o-tolidine coated sand. In sand the migration across the test cell under an applied field of 5 V/cm took only four hours. Again, the front moved uniformly across the sand, as shown by line 602 of FIG. 6. The electric field was able to control the movement of peroxymonosulfate across both very low permeability soil (Kaolin clay in 601) and very high permeability soil (sand in 602). This demonstrates that soil permeability is not as severe a limitation for electromigration, as low permeability is for hydraulic migration and high permeability is for electroosmosis.

Example III

The procedure described in Examples I and II, above, was repeated again using o-tolidine coated Kaolin clay and peroxydisulfate as the oxidant. The applied electric field was increased from 25 V (5 V/cm) to 100 V (20 V/cm) in order to increase the temperature within the soil. As shown by line 603 of FIG. 6, the complete electromigration of the oxidant across the cell required only one hour. The ionic conductivity of the clay was low at the beginning of the experiment and the subsequent current density at the electrodes was too low to measure with the available equipment and the temperature within the clay compartment was ambient (20° C.). As the peroxydisulfate migrated across the soil, the current density increased at the electrodes and the temperature rose significantly within the clay. As the peroxydisulfate front reached the anode compartment the temperature increased dramatically and remained around 60° C. The current density increased to 2.2 mA/cm$^2$. The elevated soil temperatures were maintained as long as sufficient peroxydisulfate solution was maintained within the oxidant compartment, but the current density and soil temperature decreased once all of the peroxydisulfate ions were collected and removed from the anode compartment.

Example IV

An experiment was carried out by addition of Oxone to an aqueous solution of atrazine in order to demonstrate the oxidizing ability of peroxymonosulfate. Atrazine is a herbicide used widely throughout the world. It was chosen as a representative contaminant because it is a common soil contaminant with low solubility that is not readily biodegraded or chemically oxidized. It has a variety of chemical substituent groups and can represent chlorinated, amino, and aromatic compounds. In the presence of peroxymonosulfate solution, the atrazine was completely oxidized within 24 hours, as shown by the data points comprising line 741, in FIG. 7, supra. When $^{14}$C-ring labeled atrazine was used, soluble $^{14}$C-labeled reaction products remained in solution for approximately 1000 hours, see line 742 in FIG. 7, supra. As the total organic carbon in solution decreased, $^{14}$C-labeled $CO_2$ was observed to form, see line 743 in FIG. 7, supra. After 1000 hours, approximately 90 percent of the atrazine was converted to $CO_2$, the remaining 10 percent was converted to cyanuric acid. It is, of course, readily appreciated that cyanuric acid degrades slowly, and is biodegradable and considerably less toxic than is atrazine.

Example V

The procedure in Example IV, supra, was repeated, however, in this example the fate of the peroxysulfate oxidant in soil was monitored. Peroxymonosulfate, peroxydisulfate, and sulfate concentrations in soil were measured by Raman spectroscopy. The graph in FIG. 8, supra, demonstrates the selectivity of peroxymonosulfate and peroxydisulfate for the target contaminants. In the presence of inorganic soil constituents, such as sand (see line 851 in FIG. 8, supra) or Kaolin clay (see line 852 in FIG. 8, supra), peroxymonosulfate did not degrade appreciably over the experimental time frame. In the presence of soil, such as Decatur silt loam, peroxymonosulfate degraded (see line 853 in FIG. 8, supra), but peroxydisulfate did not (see line 854 in FIG. 8, supra). In the presence of a contaminated soil, in this case atrazine on Decatur silt loam (see line 855 in FIG. 8, supra), peroxymonosulfate was rapidly consumed.

Example VI

In order to demonstrate the advantages of using electromigration of peroxysulfate for in situ soil remediation, the tests comprising this example were conducted in three experiments. The first experiment used peroxymonosulfate migrating across atrazine contaminated soil under an electric field. The second experiment used a hydraulic gradient to move peroxymonosulfate across the soil, and the third experiment relied on electric fields to extract atrazine from the soil. The bar charts shown in FIG. 9 demonstrate the results of these experiments. In one experiment, an atrazine contaminated clay column was treated for 72 hours by the electromigration of peroxymonosulfate. An electric field of 5 V/cm was applied across the electrokinetic test cell (shown in FIG. 5) initially containing atrazine contaminated clay in compartment 502 and peroxymonosulfate solution in compartment 501. After electrokinetically passing peroxymonosulfate through the clay column, the atrazine concentration in the clay was reduced from 1000 ppm (bar chart 961) to 1.1 ppm (bar chart 962). In the second experiment, when no electric field was applied and the peroxymonosulfate was allowed to migrate under a hydraulic head of 3 cm, the atrazine concentration on the clay was reduced from 1000 ppm (bar chart 963) to 466 ppm (bar chart 964). The hydraulic head was created by maintaining a constant 3 cm tall hydraulic head of electrolyte solution in compartment 520 (see FIG. 5 for a diagram and numbering of the test cell) by pumping solution into 526*b* and collecting the overflow from 527*b*. The cell was allowed to drain from compartment 523 through 526*a*. The cell contained fine grained, low permeability Kaolin clay, and after 72 hours of reaction time only 24 mL of solution, approximately 0.5 pore volumes, had eluted from the column. The eluant contained peroxymonosulfate, so sufficient time was allowed for the oxidant to migrate through the entire soil column. Despite the presence of oxidant in the eluant, the substantial quantities of contaminant remaining in the soil suggests that significant channeling and by-pass flow occurred. In the third experiment, an electric field of 5 V/cm was applied across the cell, but no peroxymonosulfate was added. Under these conditions, the atrazine concentration in the clay was reduced from 1000 ppm (bar chart 965) to 683 ppm (bar chart 966). The remaining atrazine was all accounted for in the cathodic compartment. In summary, electroosmosis was able to remove 31.7 percent of the atrazine from the soil column, peroxymonosulfate migrating under a hydraulic gradient removed 53.4 percent of the atrazine, and peroxymonosulfate migrating under an electric field removed 99.9 percent of the atrazine from the soil column. The results clearly demonstrate the improvements in in situ soil decontamination afforded by electromigration of the oxidant solution.

Example VII

Although the tests comprising the six examples, supra, were carried out for the sake of ease and convenience on the organic contaminant, atrazine, principally because it reacts typically to many other organic contaminants in a soil type environment, and under treatment conditions that unfortunately have been scattered about numerous soil sites in this country; it is, of course, understood that these peroxysulfates are quite useful in degrading in situ under the effect of electromigration as herein described virtually all organic compounds. Accordingly, for purposes of this example, treatability studies were carried out for a variety of common organic contaminants. The observance of degradation of these compounds by peroxysulfate compounds in soil was used for the collection of baseline information upon which reasonably reliable extrapolations were effected to arrive at the listing of treatable organic contaminants listed in the third table comprising invention parameters below.

INVENTION PARAMETERS

After sifting and winnowing through the data supra, as well as other results and operations of the instant new, novel, and improved technique, including methods and means for the effecting thereof, the operating variables, including the acceptable and preferred conditions for carrying out this invention are summarized below.

TABLE 1

Process Parameters for Peroxydisulfate

| Variables | Operating Limits | Preferred Limits | Most Preferred Limits |
|---|---|---|---|
| Electric field gradient | 20–10,000 V/m | 500–2000 V/m | 1000 V/m |
| Current Density | 0.1–50 A/m$^2$ | 1–10 A/m$^2$ | 1–2 A/m$^2$ |
| Soil Temperature Generated During Treatment | 40–90° C. | 40–60° C. | 60° C. |
| Soil Particle Size | All soils | Silts or Clays (<50 μm) | Clays (<2 μm) |
| Soil Composition | All soils | Low carbonate content | Low carbonate and organic matter content |
| Soil pH | <8 | 1–6 | 4 |
| Contaminant Concentration | residual–pure phase | 10–10,000 ppm | 100–1000 ppm |
| Electrode spacing between anode and cathode) | 0.5–10 m | 1–3 m | 1 m |
| Electrode Depth | 1–20 m | 1–5 m | 1 m |
| Pore Fluid Ionic Strength | 0.1–500 mM | 0.5–5 mM | 1 mM |

TABLE 2

Process Parameters for Peroxymonosulfate

| Variables | Operating Limits | Preferred Limits | Most preferred Limits |
|---|---|---|---|
| Electric field gradient between anode and cathode | 20–10,000 V/m | 200–1000 V/m | 500 V/m |
| Current Density | 0.1–50 A/m$^2$ | 0.1–1 A/m$^2$ | 0.3–0.5 A/m$^2$ |
| Soil Temperature Generated During Treatment | 10–90° C. | 20–30° C. | 20° C. |
| Soil Particle Size | All soils | Silts or Clays (<50 μm) | Clays (<2 μm) |
| Soil Composition | All soils | Soils of low carbonate content | Soils of low carbonate and organic matter content |
| Soil pH | <8 | 1–6 | 2 |
| Contaminant Concentration | residual–pure phase | 10–10,000 ppm | 100–1000 ppm |
| Electrode spacing (between anode and cathode) | 0.5–10 m | 1–3 m | 1 m |
| Electrode Depth | 1–20 m | 1–5 m | 1 m |
| Pore Fluid Ionic Strength | 0.1–500 mM | 0.5–5 mM | 1 mM |

TABLE 3

Example Treatable Contaminants

| Example Contaminant Class | Tested Contaminants | Applicable Oxidant | Preferred Oxidant |
| --- | --- | --- | --- |
| Halogenated Aromatic | polychlorinated biphenyls | peroxydisulfate | peroxydisulfate |
| Halogenated Aliphatic | chloroform, 1,1,1-trichloroethane, trichloroethylene, chloropicrin | peroxydisulfate | peroxydisulfate |
| Aromatic amine | atrazine O-tolidine | peroxymonosulfate, peroxydisulfate | peroxymonosulfate |
| Organophosphorus | diisopropyl methylphosphonate, O,S-diethyl phenylphosphonothioate | peroxydisulfate | peroxydisulfate |
| Energetic nitro | trinitrotoluene, hexahydro-1,3,5-trinitrotriazine | peroxydisulfate | peroxydisulfate |
| Phenols, Aldehydes, and Ketones | hydroxyatrazine 2-chloroacetophenone | peroxymonosulfate, peroxydisulfate | peroxymonosulfate |
| Organosulfur | chloroethyl ethylsulfide, chloroethyl phenylsulfide, O,S-diethyl phenylphosphonothioate | peroxymonosulfate, peroxydisulfate | peroxydisulfate |

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. An electromigration soil remediation process for in situ rendering a soil site contaminated with organic contaminants more environmentally viable by transporting thereto peroxysulfate anions, which process comprises the steps of:

(a) positioning one or more cathode electrodes at one or more first locations juxtaposed said soil site;

(b) positioning one or more anode electrodes at one or more second locations juxtaposed said soil site;

(c) establishing one or more voltage gradients among said cathode electrode(s) and said anode electrode(s);

(d) supplying a remediating fluid from a source external to said soil site to a region in said soil site juxtaposed said one or more cathode electrodes, said remediating fluid comprising an aqueous solution of at least one peroxysulfate compound, said cathode electrode(s) being arranged to permit said remediating fluid to flow from the vicinity of said cathode electrode(s) into said soil site, the one or more voltage gradients causing said peroxysulfate anions, resulting from dissociation of said at least one peroxysulfate compound, to move, by electromigration, into said soil site toward said one or more anode electrodes and to effectively degrade said organic contaminants and to thereby render said soil site substantially more environmentally viable.

2. The process of claim 1, wherein said peroxysulfate compound comprises peroxymonosulfate, peroxydisulfate, or both.

3. The process of claim 1, wherein the supply of remediating fluid to said soil site is in a region thereof disposed generally between said one or more cathode electrodes and said one or more anode electrodes.

4. The process of claim 3, further defined by the fact that said region is physically disposed closer to said one or more cathode electrodes than to said one or more anode electrodes.

5. The process of claim 3, wherein said remediating fluid is supplied to the vicinity juxtaposed said one or more cathode electrodes.

6. The process of claim 3, wherein said one or more voltage gradients are maintained at above at least about 5 volts per centimeter to thereby establish and maintain at least a portion of a said soil site at a temperature above its normal ambient temperature for effecting more efficient oxidation of recalcitrant constituents in said organic contaminant.

7. The process of claim 6, wherein the resulting temperature increase is at least about 20° C.

8. The process of claim 7, wherein said voltage gradient ranges between about 5 to about 20 volts per centimeter.

9. The process of claim 3, wherein there are present unreacted peroxysulfate compounds, resulting reacted compounds, and resulting aqueous solubilized organic reaction products which electromigrate through said soil site under the influence of said one or more voltage gradients are collected in porous media juxtaposed said one or more anode electrodes.

10. The process of claim 9, wherein a purge solution comprising aqueous media is introduced into contact with said one or more anode electrodes to both mitigate pH gradient buildup and to effect removal therefrom of aqueous soluble salts comprising sulfate, produced from peroxysulfate reduction, mineral acids, produced from oxidation of substituent groups on the organic contaminants and resulting incompletely oxidized organic reaction products transported thereto.

* * * * *